(12) United States Patent
Duggan

(10) Patent No.: US 6,367,680 B1
(45) Date of Patent: Apr. 9, 2002

(54) COMPONENT FOR VEHICULAR DRIVESHAFT ASSEMBLY AND METHOD OF MANUFACTURING SAME

(75) Inventor: James A. Duggan, Temperance, MI (US)

(73) Assignee: Spicer Driveshaft, Inc., Toledo, OH (US)

( * ) Notice: Subject to any disclaimer, the term of this patent is extended or adjusted under 35 U.S.C. 154(b) by 0 days.

(21) Appl. No.: 09/636,242

(22) Filed: Aug. 10, 2000

(51) Int. Cl.[7] ................................................. F16D 3/16
(52) U.S. Cl. ................................. 228/107; 29/DIG. 48; 464/134
(58) Field of Search ................................. 464/134, 135, 464/179, 182; 29/525, DIG. 48; 403/271; 228/107, 110.1, 114.5

(56) References Cited

U.S. PATENT DOCUMENTS

| | | | |
|---|---|---|---|
| 1,897,542 A | * | 2/1933 | West ........................ 464/179 X |
| 3,465,545 A | | 9/1969 | Stamm |
| 3,631,585 A | | 1/1972 | Stamm |
| 4,211,589 A | | 7/1980 | Fisher et al. |
| 4,621,760 A | | 11/1986 | King et al. |
| 4,881,924 A | * | 11/1989 | Gall ........................... 464/134 |
| 5,607,524 A | | 3/1997 | Klemp et al. |
| 5,716,276 A | * | 2/1998 | Mangas et al. ........... 464/134 X |
| 5,832,607 A | | 11/1998 | Booy |
| 5,868,517 A | * | 2/1999 | Aoki et al. ............... 464/182 X |
| 5,885,162 A | | 3/1999 | Sakamoto et al. |
| 5,951,794 A | * | 9/1999 | Dickson, Jr. ............. 464/182 X |
| 6,001,018 A | * | 12/1999 | Breese ..................... 464/134 X |
| 6,105,413 A | * | 8/2000 | Duggan et al. ........... 74/492 X |
| 6,241,616 B1 | * | 6/2001 | Lightcap ................. 464/179 X |

* cited by examiner

Primary Examiner—Lynne H. Browne
Assistant Examiner—Greg Binda
(74) Attorney, Agent, or Firm—MacMillan, Sobanski & Todd, LLC

(57) ABSTRACT

A component for use in a vehicular driveshaft assembly includes a tube yoke formed from a first material and having a hollow cylindrical sleeve portion extending co-axially therefrom. A first end of a driveshaft tube, also formed from the first material, is disposed telescopically about the sleeve portion of the tube yoke and is secured thereto using conventional welding processes. A transition member includes a main body portion having a hollow cylindrical sleeve portion that extends co-axially therefrom. A second end of a driveshaft tube is disposed telescopically about the sleeve portion of the transition member and is secured thereto using conventional welding processes. A slip tube shaft formed from a second material that is different from the first material is formed having an enlarged end portion that is generally hollow and cylindrical in shape, having an outer diameter and a wall thickness that are approximately equal to the outer diameter and wall thickness of the main body portion of the transition member. The enlarged end portion of the slip tube shaft is secured to the main body portion of the transition member by friction welding.

7 Claims, 2 Drawing Sheets

COMPONENT FOR VEHICULAR DRIVESHAFT ASSEMBLY AND METHOD OF MANUFACTURING SAME

BACKGROUND OF THE INVENTION

This invention relates in general to vehicular drive train systems including a driveshaft assembly for transferring rotational power from an engine/transmission assembly to an axle assembly. In particular, this invention relates to an improved structure for a component for use in such a vehicular driveshaft assembly and to a method of manufacturing same.

In most land vehicles in use today, a drive train system is provided for transmitting rotational power from an output shaft of an engine/transmission assembly to an input shaft of an axle assembly so as to rotatably drive one or more wheels of the vehicle. To accomplish this, a driveshaft assembly is connected between the output shaft of the engine/transmission assembly and the input shaft of the axle assembly. In some vehicles, the distance between the output shaft of the engine/transmission assembly and the input shaft of the axle assembly is relatively short. In these vehicles, the driveshaft assembly can include a single, relatively long driveshaft tube, the ends of which can be connected to the output shaft of the engine/transmission assembly and the input shaft of the axle assembly by respective universal joints. Such universal joints are well known in the art and provide a rotational driving connection therebetween, while accommodating a limited amount of angular misalignment between the rotational axes of the various shafts. In other vehicles, the distance between the output shaft of the engine/transmission assembly and the input shaft of the axle assembly is relatively long, making the use of a single driveshaft tube impractical. In these vehicles, the driveshaft assembly can include a plurality (typically two) of separate, relatively short driveshaft tube sections. The inner ends of the driveshaft sections are connected together by a first universal joint, and the outer ends of the driveshaft sections are connected to the output shaft of the engine/transmission assembly and the input shaft of the axle assembly by second and third universal joints.

It is known that a small amount of relative axial movement frequently occurs between the engine/transmission assembly and the axle assembly when the vehicle is operated. Because of this, it is often desirable that both single and multiple section driveshaft assemblies be capable of accommodating a limited amount of relative axial movement between the outer ends thereof. To accomplish this, it is known to incorporate a slip yoke assembly within the driveshaft assembly. A typical slip yoke assembly includes a slip tube shaft that is connected to one end of the driveshaft tube (or one end of one of the driveshaft tube sections) and a slip yoke that is connected to one of the universal joints. The slip tube shaft has an externally splined portion that cooperates with an internally splined portion of the slip tube yoke so as to provide a rotational driving connection therebetween, while permitting a limited amount of relative axial movement to occur.

Traditionally, the various components of the driveshaft assembly have been manufactured from steel. Steel is a relatively strong and inexpensive material that is commonly available. However, steel is relatively heavy in weight, which is disadvantageous from a fuel economy standpoint. To address this, it is known to manufacture some of the components of the driveshaft assembly from aluminum, which is a relatively strong and lightweight material. However, aluminum has a relatively low melting temperature in comparison to steel. As a result, it has been found to be relatively difficult to weld or otherwise secure aluminum driveshaft components to steel driveshaft components. Accordingly, it would be desirable to provide an improved structure for a component for use in a vehicular driveshaft assembly, and a method of manufacturing same, that facilitates the use of diverse materials, such as steel and aluminum.

SUMMARY OF THE INVENTION

This invention relates to an improved structure for a component for use in a vehicular driveshaft assembly, and a method of manufacturing same, that facilitates the use of diverse materials, such as steel and aluminum. The driveshaft component includes a tube yoke formed from a first material and having a hollow cylindrical sleeve portion extending co-axially therefrom. A first end of a driveshaft tube, also formed from the first material, is disposed telescopically about the sleeve portion of the tube yoke and is secured thereto using conventional welding processes or other techniques that are suited for joining components formed from similar materials. The driveshaft component further includes a transition member that is also preferably formed from the first material. The transition member includes a main body portion having a hollow cylindrical sleeve portion that extends co-axially therefrom. The main body portion of the transition member is preferably formed having a wall thickness that is greater than the wall thickness of the sleeve portion. A second end of a driveshaft tube is disposed telescopically about the sleeve portion of the transition member and is secured thereto using conventional welding processes or other techniques that are suited for joining components formed from similar materials. Lastly, the driveshaft component includes a slip tube shaft that is preferably formed from a second material that is different from the first material. To facilitate the securement to the transition member, the slip tube shaft is formed having an enlarged end portion that is generally hollow and cylindrical in shape, having an outer diameter and a wall thickness that are approximately equal to the outer diameter and wall thickness of the main body portion of the transition member. The enlarged end portion of the slip tube shaft is secured to the main body portion of the transition member using a process that is suited for joining components formed from dissimilar materials, such as by friction welding. The increased wall thickness of the main body portion of the transition member facilitates the performance of the friction welding process because the increased wall section's ability to resist tearing from the velocity induced shear stress during the frictional heat generation and forging operation at welding. However, because the driveshaft tube is formed from the same or similar material as the transition member, it can be secured thereto using conventional welding processes as described above. Consequently, the wall thickness of the driveshaft tube can be maintained at a minimum throughout the length thereof so as to minimize the overall weight of the driveshaft assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
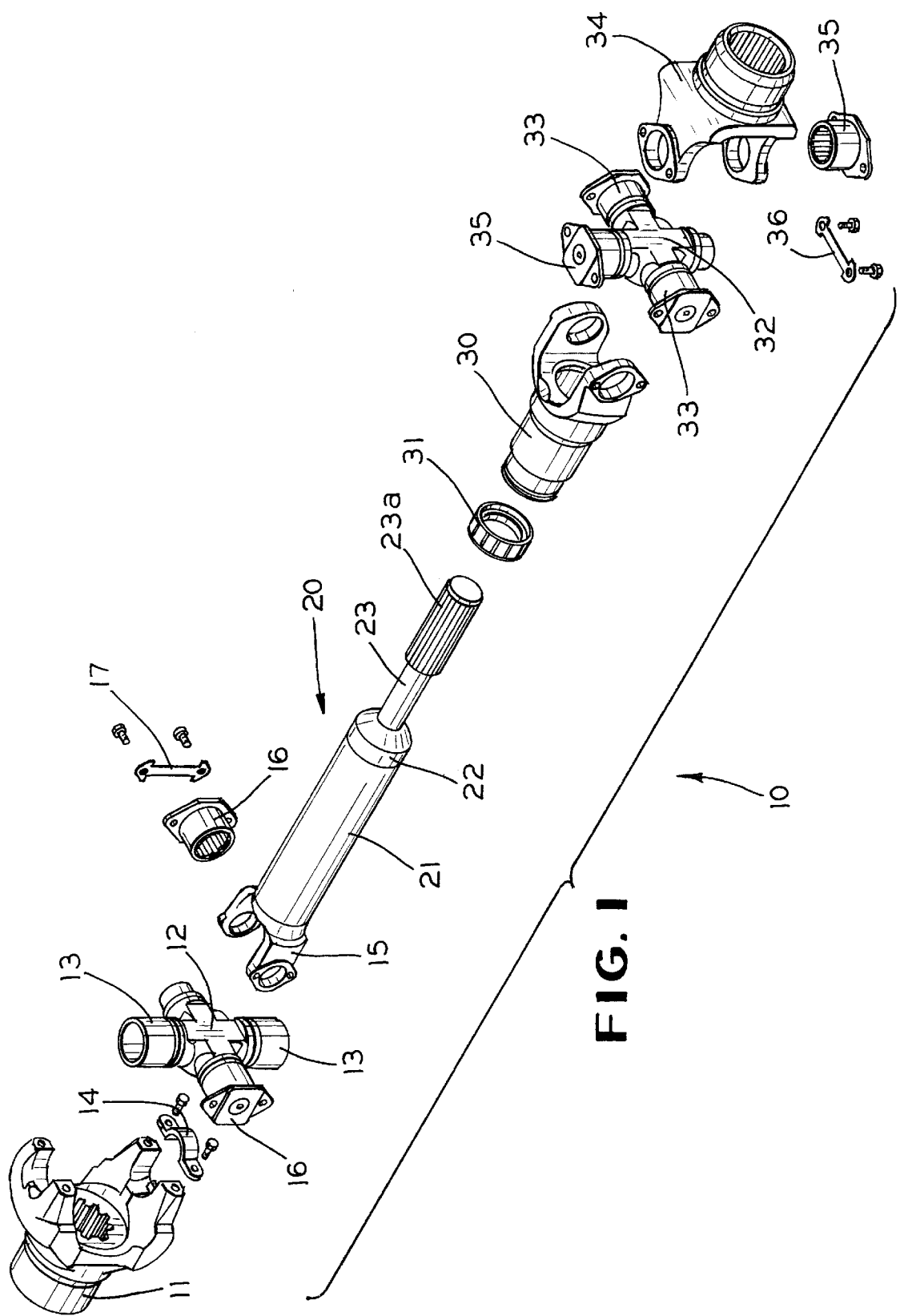
FIG. 1 is an exploded perspective view of a vehicular driveshaft assembly including a component structured and manufactured in accordance with this invention.

Referring now to the drawings, there is illustrated in FIG. 1 a driveshaft assembly, indicated generally at 10, that is adapted to transmit rotational power from an output shaft (not shown) of an engine/transmission assembly to an input shaft (not shown) of an axle assembly so as to rotatably drive one or more wheels of the vehicle. Although this invention will be described and illustrated in the context of the driveshaft assembly 10 illustrated therein and described below, it will be appreciated that this invention may be practiced to form any desired component of any type of driveshaft assembly for use in a vehicular drive train system or other torque transmitting structure.

The illustrated driveshaft assembly 10 includes an end yoke 11 or other similar structure that can be splined or otherwise connected to the output shaft of the engine/transmission assembly so as to be rotatably driven thereby. The end yoke 11 has a pair of yoke arms that are secured to a first opposed pair of trunnions of a cross 12, such as by respective bearing cups 13 and retainer straps, one of which is shown at 14. A second opposed pair of trunnions of the cross 12 are secured to the arms of a tube yoke 15 or other similar structure, such as by respective bearing cups 16 and retainer straps, one of which is shown at 17. The end yoke 11, the cross 12, and the tube yoke 15 form a first universal joint assembly that provides a rotational driving connection between the end yoke 11 and the tube yoke 15, while accommodating a limited amount of angular misalignment between the rotational axes thereof.

The tube yoke 15 is provided at one end of a component, indicated generally at 20, of the driveshaft assembly 10 that is structured and manufactured in accordance with this invention. The driveshaft component 20 further includes a driveshaft tube 21, a transition member 22, and a slip tube shaft 23 having an externally splined end portion 23a. The structure of the driveshaft component 20 and its method of manufacture will be described in detail below.

The externally splined end portion 23a of the slip tube shaft 23 cooperates with an internally splined portion of a slip yoke 30 to provide a rotational driving connection therebetween, while permitting a limited amount of relative axial movement to occur during use. Typically, a conventional seal assembly 31 extends between the slip tube shaft 23 and the slip yoke 30 to prevent dirt, water, and other contaminants from entering into the region of the cooperating splines. The slip yoke 30 has a pair of yoke arms that are secured to a first opposed pair of trunnions of a cross 32, such as by respective bearing cups 33 and retainer straps (not shown). A second opposed pair of trunnions of the cross 32 are secured to the arms of an end yoke 34 or other similar structure, such as by respective bearing cups 35 and retainer straps, one of which is shown at 36. The slip yoke 30, the cross 32, and the end yoke 34 form a second universal joint assembly that provides a rotational driving connection between the slip yoke 30 and the end yoke 34, while accommodating a limited amount of angular misalignment between the rotational axes thereof. The end yoke 34 can be splined or otherwise connected to the input shaft (not shown) of the axle assembly so as to rotatably drive same.

Figure 2:
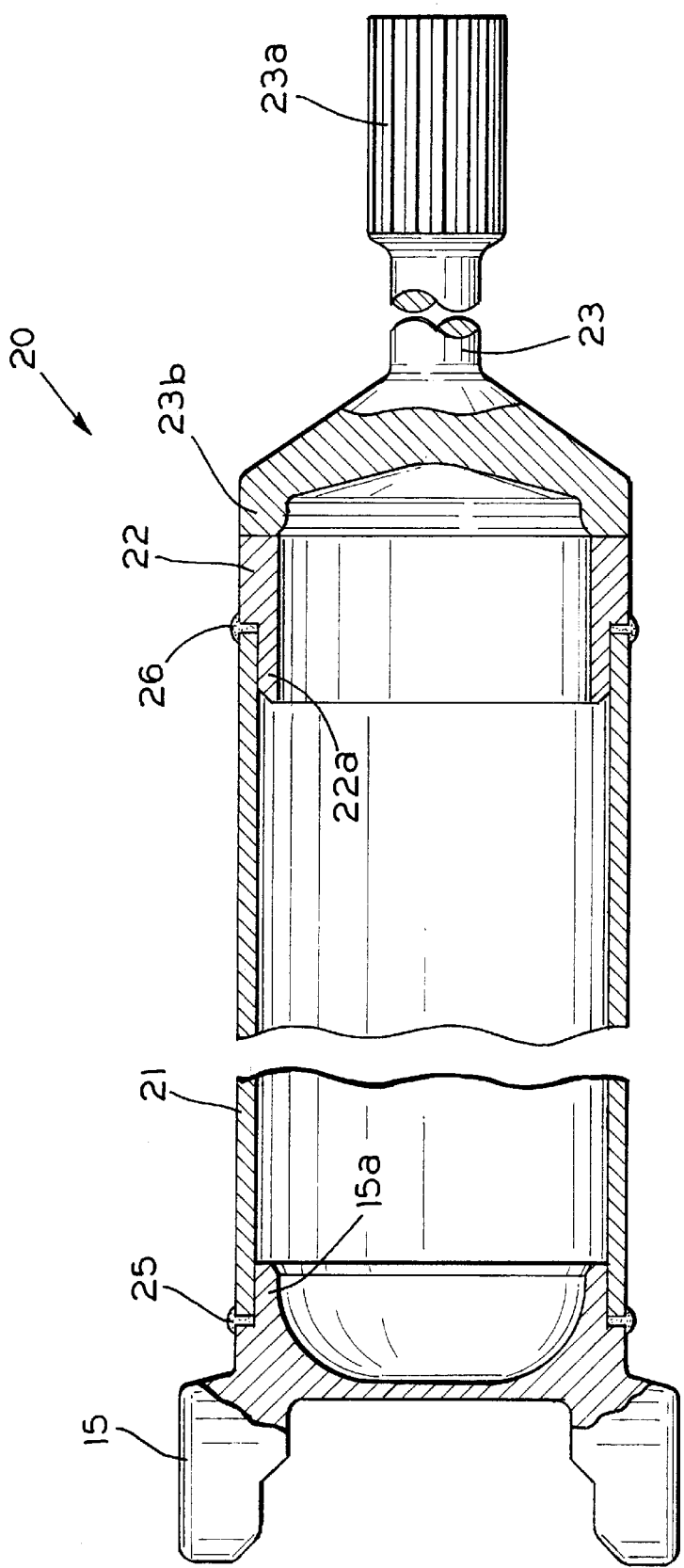
FIG. 2 is an enlarged sectional elevational view of the component of the driveshaft assembly illustrated in FIG. 1.

Referring now to FIG. 2, the structure of the driveshaft component 20 is illustrated in detail. As mentioned above, the driveshaft component 20 includes the tube yoke 15, the driveshaft tube 21, the transition member 22, and the slip tube shaft 23. The tube yoke 15 is preferably formed from a first material, such as a conventional aluminum alloy material (6061-T6 aluminum allow, for example) and includes a hollow cylindrical sleeve portion 15a that extends co-axially from the arms thereof. The sleeve portion 15a of the tube yoke 15 has an outer surface that is adapted to receive a first end of the driveshaft tube 21 telescopically thereabout. To accomplish this, the sleeve portion 15a of the tube yoke 15 is preferably formed having an outer surface defining an outer diameter that is approximately equal to an inner diameter defined by an inner surface of the driveshaft tube 21. The sleeve portion 15a can be formed using conventional processes, such as machining, and the like. Thus, the sleeve portion 15a of the tube yoke 15 can be received within the driveshaft tube 21 in a press fit relationship. The driveshaft tube 21 is preferably formed from the same or similar material as the tube yoke 15. Then, the driveshaft tube 21 and the tube yoke 15 can be secured together using conventional welding processes (Metal Inert Gas (MIG) welding, for example, such as shown at 25) or other techniques that are suited for joining components formed from similar materials.

The transition member 22 is also preferably formed from the same or similar material as the tube yoke 15 and the driveshaft tube 21. The transition member 22 includes a main body portion having a hollow cylindrical sleeve portion 22a that extends co-axially therefrom. The main body portion of the transition member 22 is preferably formed having a wall thickness that is greater than the wall thickness of the sleeve portion 22a, for a reason that will be described below. As a practical matter, the wall thickness of the main body portion of the transition member 22 is also preferably greater than the wall thickness of the driveshaft tube 21. The sleeve portion 22a of the transition member 22 has an outer surface that is adapted to receive a second end of the driveshaft tube 21 telescopically thereabout. To accomplish this, the sleeve portion 22a of the transition member 22 is preferably formed having an outer surface defining an outer diameter that is approximately equal to the inner diameter defined by the inner surface of the driveshaft tube 21. In a manner similar to the sleeve portion 15a, the sleeve portion 22a can be formed using conventional processes, such as machining, and the like. Thus, the sleeve portion 22a of the transition member 22 can be received within the driveshaft tube 21 in a press fit relationship. Then, the driveshaft tube 21 and the transition member 22 can be secured together using conventional welding processes (Metal Inert Gas (MIG) welding, for example, such as shown at 26) or other techniques that are suited for joining components formed from similar materials.

Because of the externally splined end portion 23a, the slip tube shaft 23 is preferably formed from a second material (such as 1541 heat treated steel alloy, for example) that is different from the first material. To facilitate the securement to the transition member 22, the slip tube shaft 23 is formed having an enlarged end portion 23b. The illustrated end portion 23b is generally hollow and cylindrical in shape, having an outer diameter and a wall thickness that are approximately equal to the outer diameter and wall thickness of the main body portion of the transition member 22, respectively.

The enlarged end portion 23b of the slip tube shaft 23 is preferably secured to the main body portion of the transition member 22 using a process that is suited for joining components formed from dissimilar materials, such as by friction welding, pulse welding, explosion welding, inertia welding, magnetic impelled arc bonding, and the like. For example, to join the components by friction welding, the adjacent surfaces of the enlarged end portion 23b of the slip tube shaft 23 and the main body portion of the transition member 22 are initially rotated relative to one another at a relatively high speed. Then, the adjacent surfaces of the enlarged end portion 23b of the slip tube shaft 23 and the main body portion of the transition member 22 are moved into engagement with one another under axial load. Frictional heat is developed at these engaging surfaces until the materials of the enlarged end portion 23b of the slip tube shaft 23 and the main body portion of the transition member 22 become plastic. At that time, the relative rotation of the enlarged end portion 23b of the slip tube shaft 23 and the main body portion of the transition member 22 is stopped, and the axial load between the two members is increased to consolidate the joint. The softened materials of the enlarged end portion 23b of the slip tube shaft 23 and the main body portion of the transition member 22 coalesce to form a strong joint therebetween.

As mentioned above, the main body portion of the transition member 22 has a greater wall thickness than the sleeve portion 22a thereof. Such increased wall thickness has been found to facilitate the performance of the friction welding process because the increased wall section's ability to resist tearing from the velocity induced shear stress during the frictional heat generation and forging operation at welding. The increased wall thickness of the main body portion of the transition member 22 provides a sufficient amount of the aluminum material at the point of engagement with the enlarged end portion 23b of the slip tube shaft 23 to allow the friction welding process to be performed relatively easily. However, because the driveshaft tube 21 is formed from the same or similar material as the transition member 22, it can be secured thereto using the conventional welding processes as described above. Consequently, the wall thickness of the driveshaft tube 21 can be maintained at a minimum throughout the length thereof so as to minimize the overall weight of the driveshaft assembly 10.

A method of manufacturing the component 20 in accordance with the invention will now be described. First, the end portion 23b of the slip tube shaft 23 and the transition member 22 are joined together using processes for joining components formed from dissimilar materials, such as by friction welding, pulse welding, explosion welding, inertia welding, magnetic impelled arc bonding, and the like. Then, the sleeve portion 22a is formed in the transition member 22 and the sleeve portion 15a is formed in the tube yoke 15 using conventional processes, such as machining, and the like. Next, the sleeve portions 15a and 22a are press fit into the driveshaft tube 21. Then, the driveshaft tube 21 is secured to the yoke tube 15 and the transition member 22 using conventional welding processes (Metal Inert Gas (MIG) welding, for example, such as shown at 25 and 26) or other techniques that are suited for joining components formed from similar materials. It will be appreciated that the invention is not limited by the order in which the driveshaft tube 21 is secured to the sleeve portions 15a and 22a.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, various end component configurations utilizing dissimilar metals can be disposed at both ends of the driveshaft tube 21 rather than only one end shown in the illustrated embodiment of the invention.

What is claimed is:

1. A method of manufacturing a component for a driveshaft assembly comprising the steps of:
    (a) providing a yoke including a sleeve portion;
    (b) providing a tube having a first end and a second end;
    (c) providing a transition member including a sleeve portion and a body portion;
    (d) providing a shaft including an end portion;
    (e) securing the sleeve portion of the yoke to the first end of the tube;
    (f) securing the second end of the tube to the sleeve portion of the transition member; and
    (g) securing the body portion of the transition member to the end portion of the shaft by one of friction welding, pulse welding, explosion welding, inertia welding, and magnetic impelled arc bonding.

2. The method defined in claim 1 wherein said step (c) is performed by providing the transition member from a first material, and wherein said step (d) is performed by providing the shaft from a second material that is different from the first material.

3. The method defined in claim 1 wherein said steps (a), (b) , and (c) are performed by providing the yoke, the tube, and the transition member from a first material, and wherein said step (d) is performed by providing the shaft from a second material that is different from the first material.

4. The method defined in claim 1 wherein said step (d) is performed by providing a shaft having a first end portion and a second end portion having a plurality of splines formed thereon, and wherein said step (g) is performed by securing the body portion of the transition member to the first end portion of the shaft by one of friction welding, pulse welding, explosion welding, inertia welding, and magnetic impelled arc bonding.

5. The method defined in claim 1 wherein said step (d) is performed by providing a shaft having a first end portion and a second end portion having a plurality of splines formed thereon, and wherein said step (g) is performed by securing the body portion of the transition member to the first end portion of the shaft by one of friction welding, pulse welding, explosion welding, inertia welding, and magnetic impelled arc bonding.

6. The method defined in claim 1 wherein said step (e) is performed by initially inserting the sleeve portion of the yoke within the first end of the tube and subsequently welding the yoke to the tube.

7. The method defined in claim 1 wherein said step (f) is performed by initially disposing the second end of the tube about the sleeve portion of the transition member and subsequently welding the tube to the transition member.

* * * * *

UNITED STATES PATENT AND TRADEMARK OFFICE
CERTIFICATE OF CORRECTION

PATENT NO. : 6,367,680 B1
DATED : April 9, 2002
INVENTOR(S) : James A. Duggan

It is certified that error appears in the above-identified patent and that said Letters Patent is hereby corrected as shown below:

Column 6,
Line 45, after "of" insert -- external --.

Signed and Sealed this

Seventeenth Day of September, 2002

Attest:

JAMES E. ROGAN
Attesting Officer  Director of the United States Patent and Trademark Office